US007463134B1

(12) United States Patent
Stilley

(10) Patent No.: US 7,463,134 B1
(45) Date of Patent: Dec. 9, 2008

(54) DUAL KEY FOB

(76) Inventor: Russell L. Stilley, 3907 Belton Dr., Dallas, TX (US) 75287

( * ) Notice: Subject to any disclaimer, the term of this patent is extended or adjusted under 35 U.S.C. 154(b) by 524 days.

(21) Appl. No.: 11/097,782

(22) Filed: Apr. 1, 2005

(51) Int. Cl.
*H04Q 1/00* (2006.01)

(52) U.S. Cl. .................................................... 340/5.61

(58) Field of Classification Search ................ 340/5.61, 340/5.63, 5.72, 825.72, 5.64, 825.71, 5.25; 341/176; 200/341, 500; 455/171
See application file for complete search history.

(56) References Cited

U.S. PATENT DOCUMENTS

| | | | | |
|---|---|---|---|---|
| 4,045,984 | A | 9/1977 | McDonald | |
| 4,276,582 | A | 6/1981 | Burnett | |
| 4,521,833 | A | 6/1985 | Wolter | |
| 4,524,594 | A | 6/1985 | Bascou | |
| 4,596,126 | A | 6/1986 | Sorensen | |
| 4,646,913 | A | 3/1987 | Wing et al. | |
| 4,660,397 | A | 4/1987 | Girimont | |
| 4,831,504 | A | 5/1989 | Nishizawa et al. | |
| 4,888,970 | A | 12/1989 | Kinzler et al. | |
| 4,903,514 | A | 2/1990 | Jung | |
| 4,941,569 | A | 7/1990 | Lindmayer et al. | |
| 5,117,666 | A | 6/1992 | Keefer | |
| 5,181,927 | A | 1/1993 | Song | |
| 5,215,190 | A | 6/1993 | Hoffpauir, Jr. | |
| 5,232,086 | A | 8/1993 | Montanari | |
| 5,392,622 | A | 2/1995 | O'Donnell | |
| 5,495,942 | A | 3/1996 | Izhak | |
| 5,819,568 | A | 10/1998 | Christie et al. | |
| 5,943,889 | A | 8/1999 | Chiu | |
| 6,016,676 | A | 1/2000 | McConnell | |
| 6,333,698 | B1 * | 12/2001 | Roddy | 340/825.72 |
| 6,433,728 | B1 | 8/2002 | Krupp et al. | |
| 6,545,629 | B1 | 4/2003 | Johnson et al. | |
| 6,570,486 | B1 * | 5/2003 | Simon et al. | 340/5.1 |
| 6,669,017 | B2 | 12/2003 | Linihan | |
| 6,691,539 | B2 | 2/2004 | Jacob et al. | |
| 6,705,141 | B1 | 3/2004 | Jacob et al. | |
| 6,713,895 | B1 | 3/2004 | Krapfl | |
| 6,791,449 | B2 | 9/2004 | Dewan | |
| 6,852,929 | B2 | 2/2005 | Scudder | |
| 2001/0035811 | A1 * | 11/2001 | Dewan | 340/5.25 |
| 2004/0099430 | A1 * | 5/2004 | Scudder | 174/52.3 |
| 2004/0201512 | A1 * | 10/2004 | Sugimoto et al. | 341/176 |

* cited by examiner

*Primary Examiner*—Brian Zimmerman
*Assistant Examiner*—Nabil H Syed
(74) *Attorney, Agent, or Firm*—Roger N. Chauza, P.C.

(57) ABSTRACT

A dual key fob adapted for employing the wireless printed circuit boards of two other wireless entry key fobs. A top and bottom cover of the composite key fob houses the two wireless printed circuit boards together with a battery holder, power transfer interfaces for coupling battery power to the wireless printed circuit boards, and two elastomeric key shorting members with push buttons accessible through openings in the top and bottom covers for allowing a person to operated the respective circuits of either wireless printed circuit board.

16 Claims, 11 Drawing Sheets

DUAL KEY FOB

TECHNICAL FIELD OF THE INVENTION

The present invention relates in general to key fobs, and more particularly to key fobs of the type for use with keyless entry systems.

BACKGROUND OF THE INVENTION

Currently, most new cars come equipped with a keyless entry fob having an electronic transmitter that allows unlocking a car door without a mechanical key. Additionally, some cars include a fob that allows the vehicle to be started without inserting mechanical keys into the ignition. Many people have two cars in a family and keep both key fobs for each car on one key ring along with mechanical car keys and other keys. When all of these keys and fobs are on one key ring, the physical size becomes large and requires a lot of space when placed in a person's pocket. Two keyless entry fobs require more space because there is a duplication of components in each fob, including two top cases, two bottom cases, two sets of batteries, etc. Thus, a need exists for a small device that can house two keyless fob transmitters. This would eliminate duplicate components and further reduce the space in a person's pocket or purse taken up by having two separate keyless fobs on one key ring.

SUMMARY OF THE INVENTION

The present invention relates to keyless entry fobs and keyless engine starting fobs for vehicles. According to an embodiment, disclosed is a housing and a battery holder with contacts for powering two different wireless printed circuit boards. Two different keyless transmitter printed circuit boards are assembled on either side of the battery holder. Further included is means for mating the battery contacts on the transmitter printed circuit boards to the electrical contacts on the battery holder. One common set of batteries powers both keyless transmitter printed circuit boards. The battery holder is further designed such that it can accommodate most existing keyless entry fob printed circuit boards or keyless engine starting fob printed circuit boards from any vehicle manufacturer. Also included are means for activating the transmitter printed circuit boards. By employing only one housing for up to two keyless entry or keyless engine starting fobs reduces the overall size thereof, as compared to existing keyless entry or engine starting fobs.

According to another embodiment of the invention, disclosed is a dual key fob which includes a first wireless circuit module adapted for transmitting information to a first vehicle, a second wireless circuit module adapted for transmitting information to a second vehicle, and an enclosure for housing the first and second wireless circuit modules.

According to another embodiment, disclosed is a dual key fob having a first and second cover adapted to form an enclosure, where the first cover has one or more apertures formed therein. Further included is a module having electronic components for transmitting information. The module has electrical switch contacts for activating the module, and power contacts for receiving power to the module. Also included is a push button member having one or more finger touch protrusions. Each protrusion is registered in a respective aperture of the first cover, and each said finger touch protrusion is adapted for movement so as to actuate respective electrical switch contacts of the module. A power transfer interface is adapted for connection to a battery. The power transfer interface has power contacts at locations corresponding to a location of the power contacts of the module.

According to yet another embodiment of the invention, disclosed is a method of assembling a key fob, comprising the steps of removing an electronic module from a first key fob associated with a first vehicle. The first electronic module has switch contacts. Included is the step of removing an electronic module from a second key fob associated with a second vehicle, where the second electronic module has switch contacts. A battery is used to power the first and second electronic modules. A first push button member equipped with a finger-operated button is placed adjacent the first electronic module so that the finger-operated button of the first push button member is able to activate the switch contacts of the first electronic module. A second push button member equipped with a finger-operated button is placed adjacent the second electronic module so that the finger-operated button of the second push button member is able to activate the switch contacts of the second electronic module. The first and second electronic modules, the battery and the first and second push button members are enclosed within an enclosure, where the enclosure has apertures so that the finger-operated buttons are accessible therein.

According to another embodiment, disclosed is a kit for making a key fob using an electronic module associated with a vehicle, and using components of a second key fob, comprising a first cover adapted for attachment to a cover of the second key fob to form an enclosure, where the first cover has one or more apertures therein. Included is a push button member. The push button member has at least one finger-operated button accessible by a respective aperture formed in the first cover. Also included is a power transfer interface adapted for coupling power from a battery to the electronic module. The power transfer interface has first and second contacts connected together, where the first contact is located on one side of the power transfer interface in electrical contact with the battery. The second contact is located on an opposite side of the power transfer interface in a location for contacting a power contact of the electronic module.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
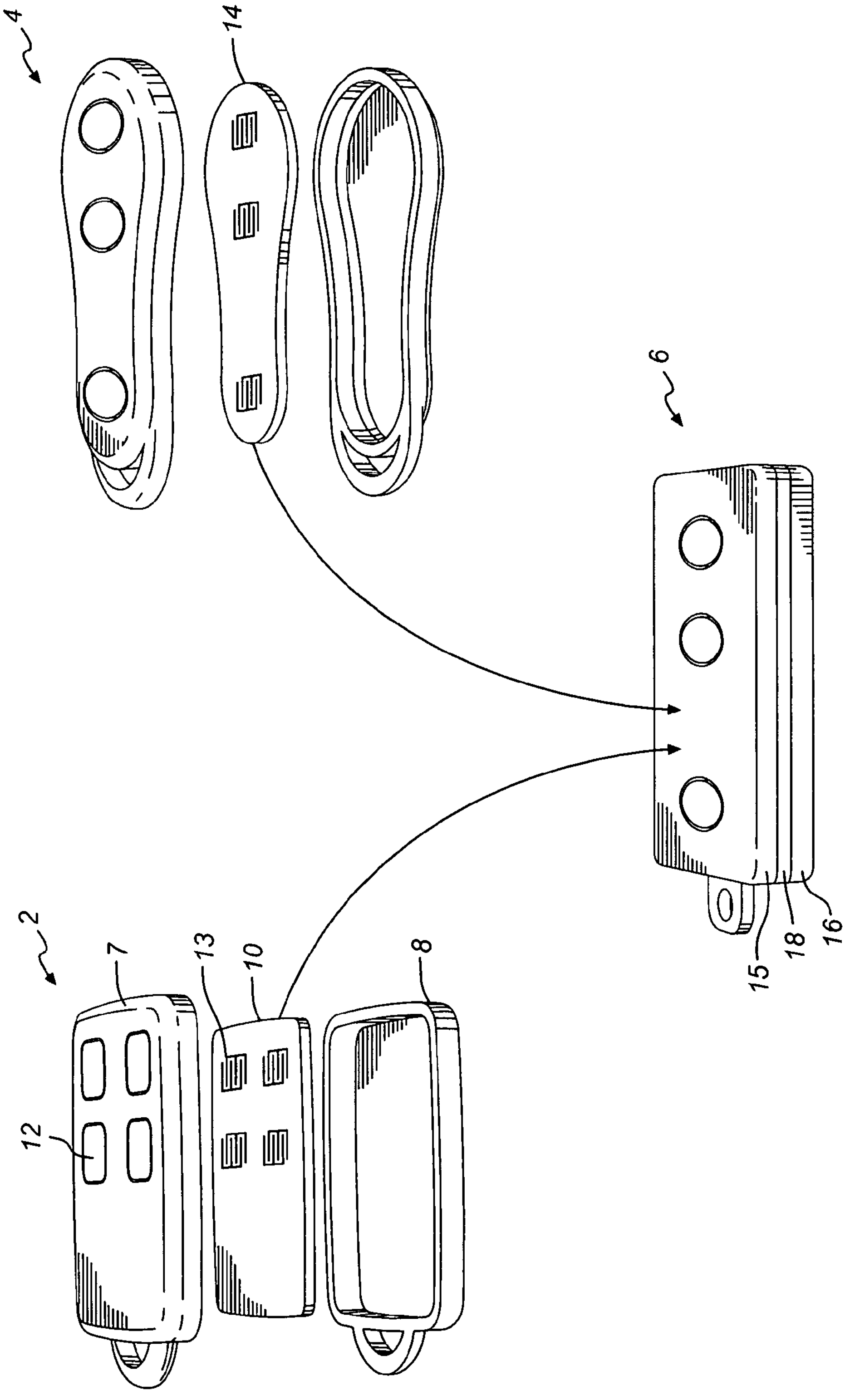
FIG. 1 illustrates two wireless printed circuit boards from existing keyless entry fobs, combined into a single dual key fob.

FIG. 1 illustrates a feature of the invention in which respective components of a first key fob 2 and a second key fob 4 can be integrated into a third dual key fob 6. The first key fob 2 is of conventional design for operating the door locks, alarm system, etc., of a vehicle, such as a Chevrolet. The second key fob 4 is also of conventional design for operating the apparatus of another vehicle, such as a Ford. Both key fobs 2 and 4 function independently of each other to operate the apparatus of the different vehicles. In particular, it is the circuitry on respective key fobs 2 and 4 that transmit different electrical parameters to the receivers mounted to the vehicles that allow the individual operation of the door locks, alarm systems, etc.

Typically, a conventional key fob, such as key fob 2, includes an upper cover 7, a lower cover 8 and a wireless printed circuit board 10 with circuitry that produces and transmits the unique parameters which, when decoded by the receiver mounted in the vehicle, allows operation of the apparatus of the vehicle. While not shown, the key fob 2 includes a key or switch shorting member with one or more buttons 12 protruding through respective openings in the top cover 7. When depressed, the button 12 causes switch contacts 13 of the wireless printed circuit board 10 to be short circuited, thereby operating the vehicle door(s), alarm, trunk, etc. The key fob 2 is generally powered by a wafer battery (not shown) mounted either in the bottom cover 8, or to the printed circuit board 10. The bottom cover 8 is blank, in that it has no openings therein.

The second key fob 4 can be of basically the same design, although it may be a different shape, as shown, and will have a wireless printed circuit board 14 with circuits designed to produce a different frequency or pattern of information unique to the receiver of the second vehicle. As noted above, it is inconvenient for a person to carry multiple key fobs to be able to operate different vehicles.

In accordance with an important feature of the invention, the printed circuit boards 10 and 14 can be removed from the respective key fobs 2 and 4 and incorporated into a single dual key fob 6 constructed according to the invention. In this manner, a single dual key fob 6 can be carried by a person to operate two different vehicles. This reduces the inconvenience in having to carry two key fobs, or not having one key fob when it is needed. The dual key fob 6 can be constructed with a battery holder 18 sandwiched between the top and bottom covers 15 and 16.

Figure 2:
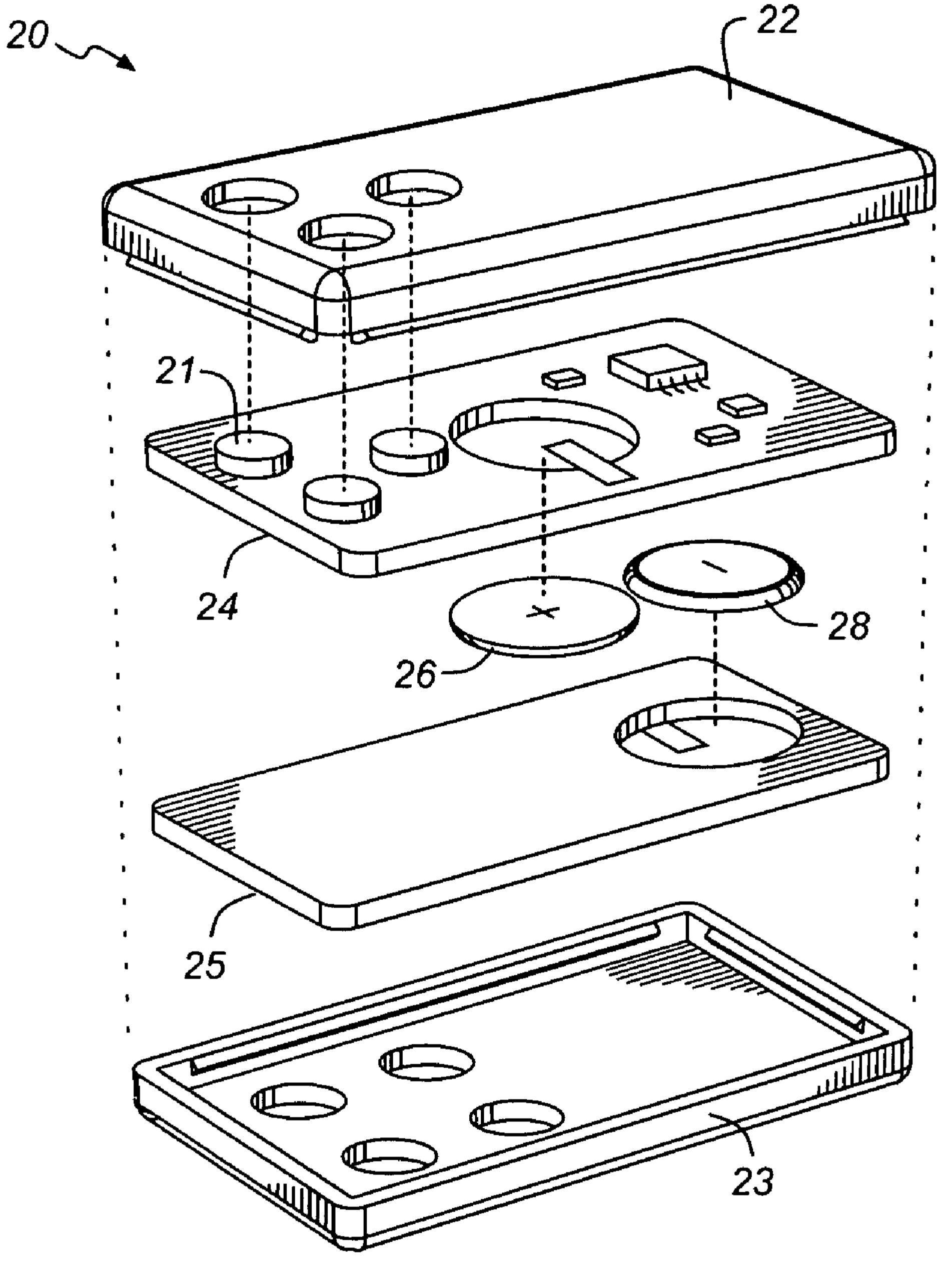
FIG. 2 is an exploded view of the components of a dual key fob according to one embodiment of the invention.

With reference now to FIG. 2 of the drawings, disclosed is a dual key fob 20 constructed according to one embodiment of the invention. The dual key fob 20 includes a top cover 22 and a bottom cover 23 that form an enclosure for the components held therein. The top and bottom covers 22 and 23 can be constructed to snap fit together in a conventional manner. The covers 22 and 23 are preferably constructed of a durable plastic material with openings therein for access to push buttons. The push buttons can be constructed of a flexible elastomeric material with conductive surfaces adapted for short circuiting switch contacts formed on the respective wireless printed circuit boards 24 and 25. Other types of push button mechanisms can be utilized. The push buttons can also be individualized elements mounted to the printed circuit boards, to the covers, or made as a unit associated with each wireless printed circuit board. As shown in FIG. 2, the three push buttons, one shown as reference numeral 21, are associated with the wireless printed circuit board 24 and are aligned with the openings in the top cover 22.

The first wireless printed circuit board 24 is preferably from a keyless entry key fob used to operate the apparatus of a first vehicle. A battery 26 is used to provide power to the circuits of the wireless printed circuit board 24. The battery 26 can be attached to the wireless printed circuit board 24 in a conventional manner so that the battery provides the appropriate polarity of voltage to the wireless circuits.

The second wireless printed circuit board 25 originates from a key fob adapted for operating a second vehicle, different from the first vehicle. A battery 28 can be secured to the second wireless printed circuit board 25 to power the circuits thereof. The wireless printed circuit boards 24 and 25 can either be physically separated from each other, or an insulating layer disposed therebetween so that the circuits of such boards do not become short circuited together.

The wireless printed circuit boards 24 and 25, and associated batteries 26 and 28, are held between the top and bottom covers 22 and 23 in a compact enclosure, less than a half inch thick. The dual key fob 20 thus allows two different vehicles to be operated, all from a compact unit that is easy to carry in one's pocket or purse.

Figure 3:
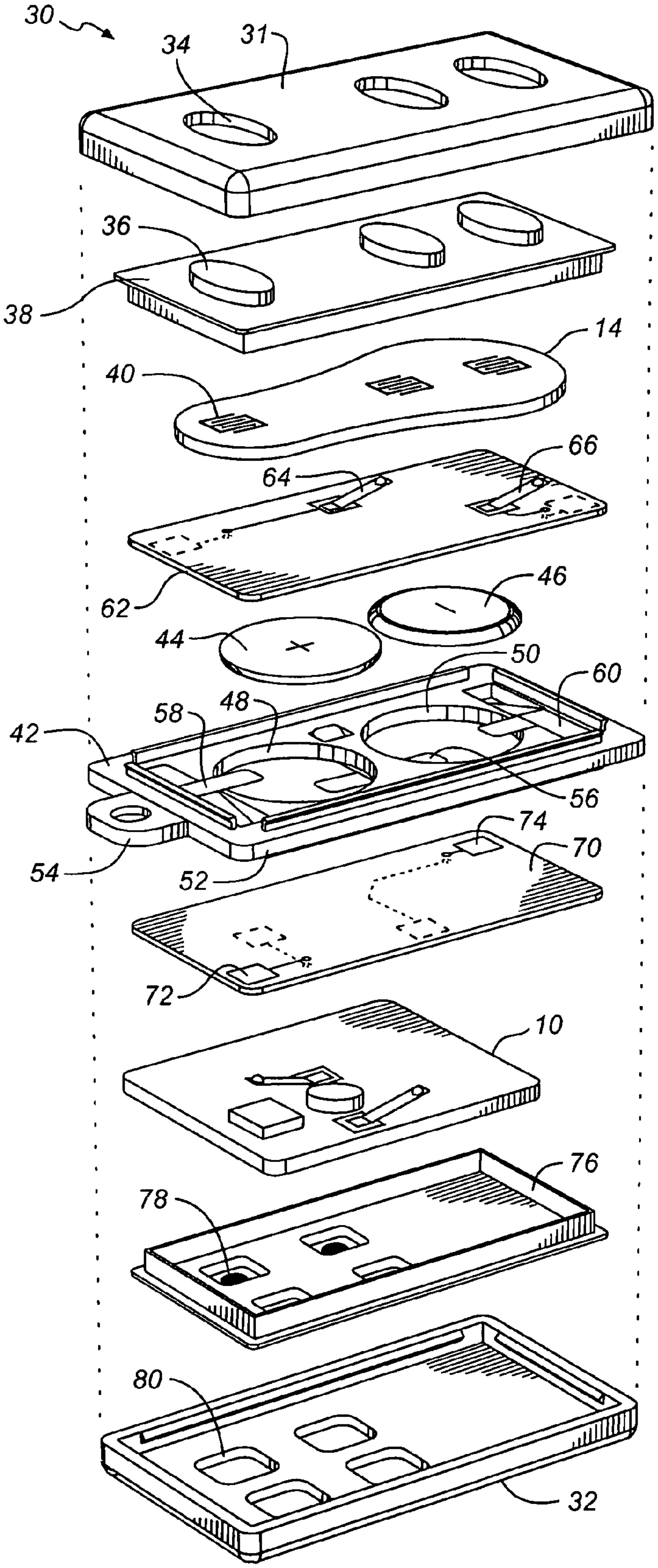
FIG. 3 is an exploded view of the components of a dual key fob according to another embodiment of the invention.

With reference now to FIG. 3, there is shown in exploded form a dual key fob 30 constructed according to another embodiment of the invention. The dual key fob 30 includes a top cover 31 and a bottom cover 32, each preferably constructed of a durable plastic material. The top and bottom covers 31 and 32 form an enclosure. The top cover 31 includes openings formed therein, one shown as reference character 34, for access to the push buttons 36 of an elastomeric key shorting member 38. In practice, the push buttons 36 may be recessed somewhat from the surface of the top cover 31 to prevent inadvertent operation thereof. The bottom surface of each push button 36 is coated with a conductive material so that when depressed, the conductive material short circuits a pair of conductors 40 formed on the underlying wireless printed circuit board 14. The key shorting member 38 would preferably be constructed with a push button aligned with each pair of switch conductors formed on the wireless printed circuit board 14. While not shown, the elastomeric key shorting member 38 includes a peripheral rib or flange formed thereon for supporting the outer edge of the wireless printed circuit board 14, especially if the wireless printed circuit board 14 is of a shape different from that of the elastomeric key shorting member 38.

It is noted that the wireless printed circuit board 14 is characterized by an irregular oval shape. Generally, the original enclosure that held the wireless printed circuit board 14 was also of a similar irregular oval shape. However, the top cover 31 that houses the wireless printed circuit board 14 is rectangular in shape. One function of the elastomeric key shorting member 38 is to provide a support flange (not shown) therein for holding the irregular-shaped wireless printed circuit board 14 in a predefined position. The flanged support would be much the same size and shape as that of the elastomeric key shorting member of the original key fob. However, the elastomeric key shorting member 38 of the invention has a peripheral shape adapted for fitting into the top cover 31, which in the illustrated embodiment is rectangular. Thus, the irregular oval-shaped wireless printed circuit board 14 is held registered in a cover of a different shape. Shapes of the covers 31 and 32 other than rectangular can readily be made and used with the principles and concepts of the invention.

The dual key fob 30 of the illustrated embodiment includes a battery holder 42 that can hold a pair of wafer-type batteries 44 and 46. As will be described below, two 3-volt batteries can be used if the wireless printed circuit boards 10 and 14 require three volts and six volts respectively. The battery holder 42 is constructed of a plastic material, with a pair of battery openings 48 and 50 for accommodating the batteries 44 and 46. The battery holder 42 includes a peripheral edge 52 that is sandwiched between the corresponding edges of the top cover 31 and the bottom cover 32. Formed as an extension of the edge 52 of the battery holder 42 is a tab 54 with an opening therein for threading a key chain or wire loop therethrough. Three electrical contact terminals 56, 58 and 60 are secured to the battery holder 42. The arrangement of the contact terminals 56, 58 and 60 allow the batteries 44 and 46 to be connected in series. As noted in FIG. 3, the batteries 44 and 46 are oriented so that the polarities are opposite. When using 3-volt batteries, the voltage available to the printed circuit boards is thus 3 volts and 6 volts. If only a single voltage is needed, then a single battery could be used. In other arrangements, dual batteries could be used in parallel to extend the life of the battery source.

In accordance with an important feature of the invention, provided is a power transfer interface 62 with a predefined orientation of contacts, for coupling the battery voltage to the power contacts of the wireless printed circuit board 14. It is appreciated that different wireless printed circuit boards are constructed with different arrangements of battery contacts, in different locations on the wireless printed circuit board. When a different wireless printed circuit board is incorporated into the dual key fob 30, the power transfer interface 62 assures that power from the battery is coupled to the specific arrangement of power contacts unique to the wireless printed circuit board. Stated another way, the power transfer interface 62 has an orientation of contacts that is made specific to the particular wireless printed circuit board that originates from another single key fob. As seen in FIG. 3, the power transfer interface 62 has a set of contacts 64 and 66 that are located such that power and ground is coupled to corresponding power contacts on the underside of the wireless printed circuit board 14. The power contacts 64 and 66 make contact respectively to the terminals 58 and 60 of the battery holder 42. The power transfer interface 62 is preferably constructed using a printed circuit board with spring loaded contacts 64 and 66 on one side thereof, and with conductor pads (not shown) on the other side for contact with the terminals 56 and 58 (3-volt operation), or 58 and 60 (6-volt operation) of the battery holder 42.

The components 38, 14 and 62 are sandwiched between the top cover 31 and the battery holder 42. These components are effective in themselves to produce a wireless frequency and or code to operate the apparatus of a vehicle. In like manner, the dual key fob 30 includes a second wireless printed circuit board 10 for producing a different wireless frequency and/or code for operating a different vehicle. A second power transfer interface 70 is effective to provide a set of power contacts to the second wireless printed circuit board 10, based on the unique location of such contacts. The second power transfer interface 70 has contacts 72 and 74 located so as to contact the terminals 58 and 60 of the battery holder 42.

An elastomeric key shorting member 76 has push buttons, one shown as reference character 78, for shorting a pair of conductors on the underside of the wireless printed circuit board 10. The push button 78 is accessed through an opening 80 in the bottom cover 32. Other push buttons of the elastomeric key shorting member 76 are similarly constructed for allowing a person to press any desired button and cause a pair of conductors to be actuated to thereby cause the wireless printed circuit board 10 to emit a unique frequency and/or code. The push buttons of one elastomeric key shorting member 76 may be colored or otherwise designed with a different visual appearance or feel, as compared to the push buttons of the other elastomeric key shorting member 38. This facilitates distinguishing which side of the dual key fob 30 to be used for a particular vehicle.

The components 70, 10 and 76 are all sandwiched between the bottom cover 32 and the battery holder 42. In practice, the dual key fob 30 constructed according to the FIG. 3 embodiment is expected to be about one-half inch thick. As will be described in detail below, the top cover 31 and the bottom cover 32 are snap fit to the battery holder 42 to form a dual key fob 30 adapted for independently operating the apparatus of two different vehicles. One or both of the wireless printed circuit boards 10 and 14 can be removed and replaced with other wireless printed circuit boards so that the user can use the dual fob 30 to operate yet other vehicles. Kits for integrating different wireless printed circuit boards into the dual key fob 30 are described below.

Figure 4A:
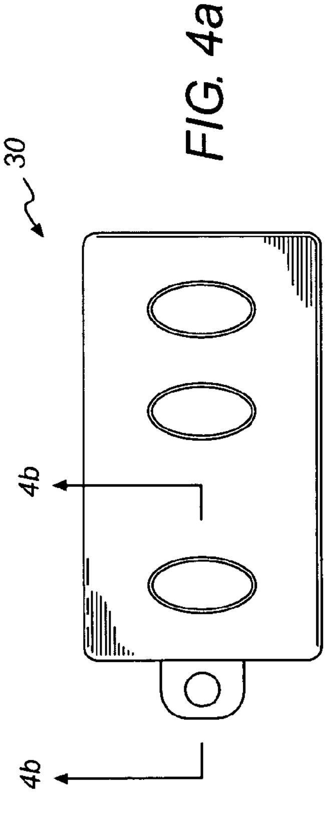
FIG. 4*a* is a top view of the dual key fob of FIG. 3.
Figure 4B:
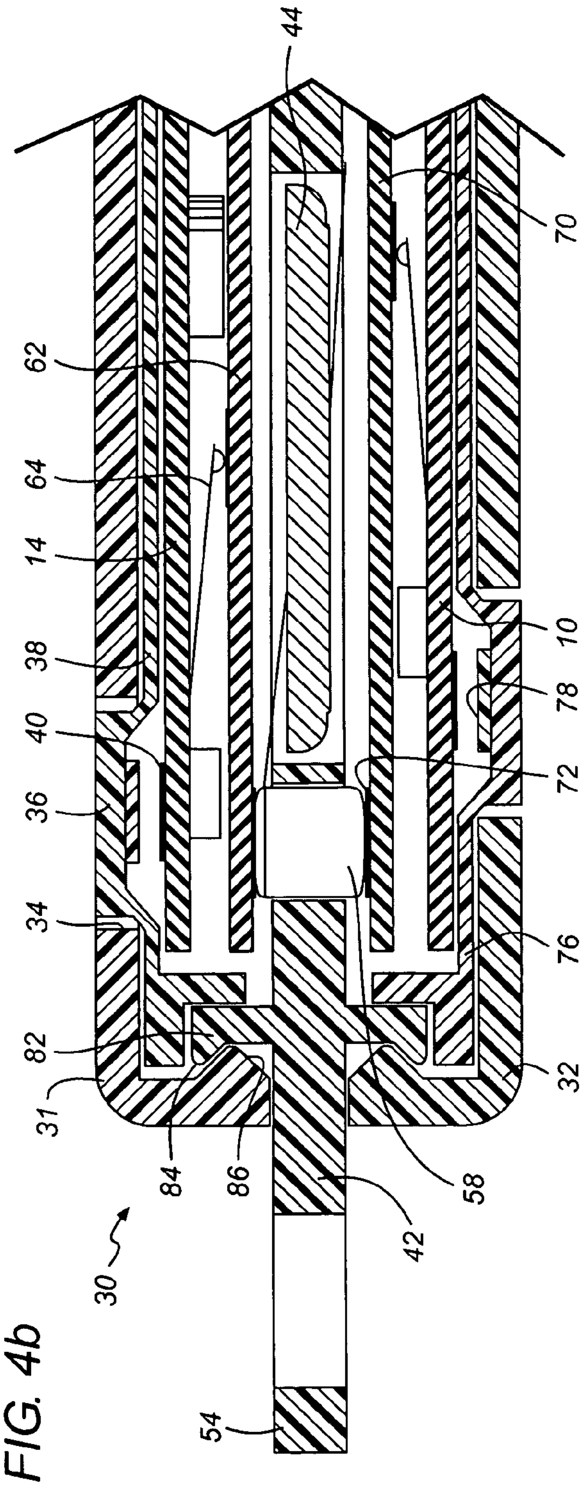
FIG. 4*b* is a cross-sectional view of the dual key fob, taken along line 4*b*-4*b* of FIG. 4*a;*

The dual key fob 30 is shown in FIG. 4*a*. A cross-sectional view of the dual key fob 30 is shown in FIG. 4*b*. As noted above, the push button 36 of the upper elastomeric key shorting member 38 is accessible through the opening 34 in the top cover 31. The elastomeric key shorting member 38 is supported in the dual key fob 30 between the inner surface of the top cover 31 and a ridge 82 formed on the battery holder 42. The peripheral edge of the elastomeric key shorting member 38 is thus squeezed between the top of the ridge 82 and the top cover 31. The ridge 82 can be formed as one or more segments on each of the four edges of the battery holder 42, as shown in FIG. 3. The lower elastomeric key shorting member 76 is supported in a similar manner between the battery holder 42 and the bottom cover 32.

In addition to providing support to the elastomeric key shorting members 38 and 76, the top ridges 82 of the battery holder 42 are structured to provide a snap fit with the top cover 31. The ridge, such as top ridge 82, is formed with an outwardly directed rib 84 which snaps over center with respect to a rib 86 formed on the inside surface of the top cover 31. When the components 31 and 42 are snap fit together, a composite unit is formed. While not shown, there is formed in the top cover 31 a slot for insertion of a coin, or the like, for prying the components 31 and 42 apart to thereby gain access to the other components for replacing a wireless printed circuit board with a different board, or to replace the batteries. The bottom cover 32 is snap fit to the battery holder 42 in a similar manner.

Figure 5A:
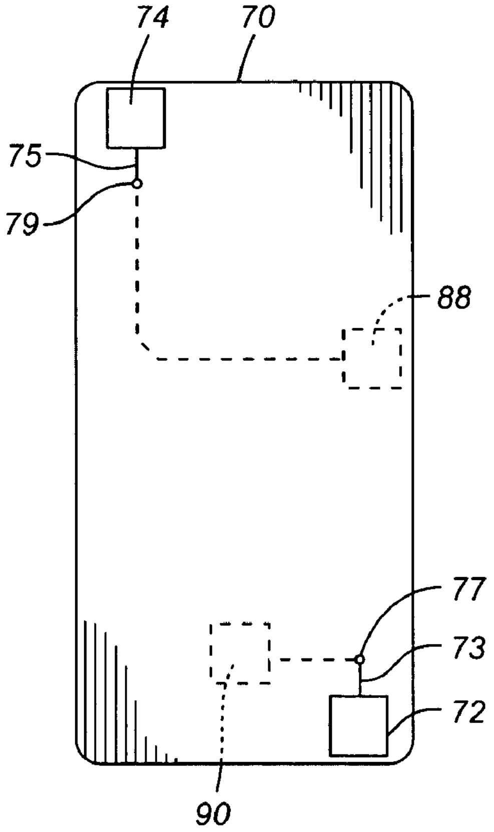
FIG. 5*a* is a plan view of the top side of a power transfer interface.
Figure 5B:
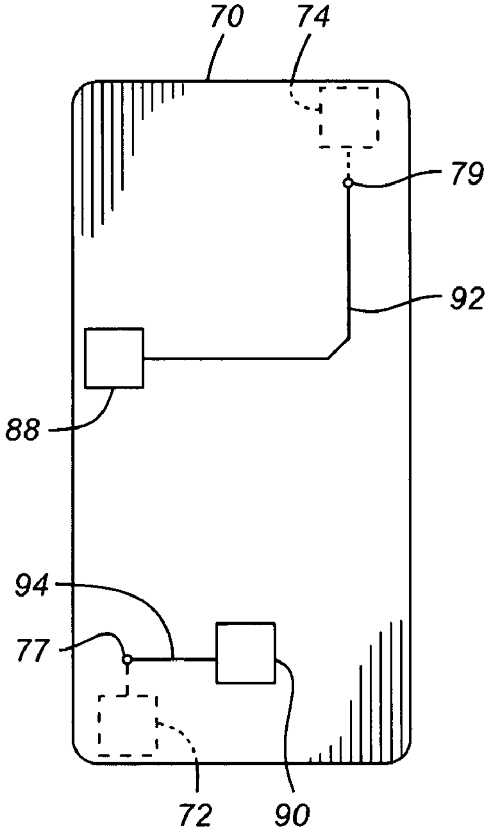
FIG. 5*b* is a plan view of the bottom side of the power transfer interface of FIG. 5*a;*

FIGS. 5*a* and 5*b* illustrate the structural features of the top and bottom of the power transfer interface 70. The power transfer interface 70 is constructed with a printed circuit board having conductive foil on both sides thereof, and plated-through holes at desired locations. The printed circuit board is masked to define the conductor paths and pads, and then etched to remove the unwanted areas of foil. What remains on the top surface (FIG. 5*a*) are terminal pads 72 and 74, and respective conductive paths 73 and 75. The conductive paths 73 and 75 connect to respective plated-through holes 77 and 79. On the bottom surface (FIG. 5*b*) of the printed circuit board are terminal pads 88 and 90. The terminal pad 88 is formed as part of path 92, and terminal pad 90 is formed as part of path 94. The paths 92 and 94 are connected to respective plated-through holes 79 and 77. As such, the terminal pad 74 on one side of the printed circuit board is connected to terminal pad 88 of the other side. In like manner, the terminal pad 72 of the top side of the printed circuit board is connected to the terminal pad 90 of the other side. In the embodiment shown, the terminal pads 72 and 74 make contact with the battery contacts of the battery holder 42, and the terminal pads 88 and 90 make contact with the power contacts of the wireless printed circuit board 20. It is contemplated that the shape of the printed circuit board of the power transfer interface 70 will be the same general shape as that of the wireless printed circuit board 20 with which it contacts.

It should be appreciated that a power transfer interface can be constructed to operate with any type of wireless printed circuit board. Generally, different wireless printed circuit boards will have power contacts located in different places. Thus, the terminal pads 88 and 90 of the power transfer interface will be located accordingly to match the locations of the power contacts of the particular wireless printed circuit board to be used. It is envisioned that there will be a specific power transfer interface for each type of wireless printed circuit board.

Figure 6A:
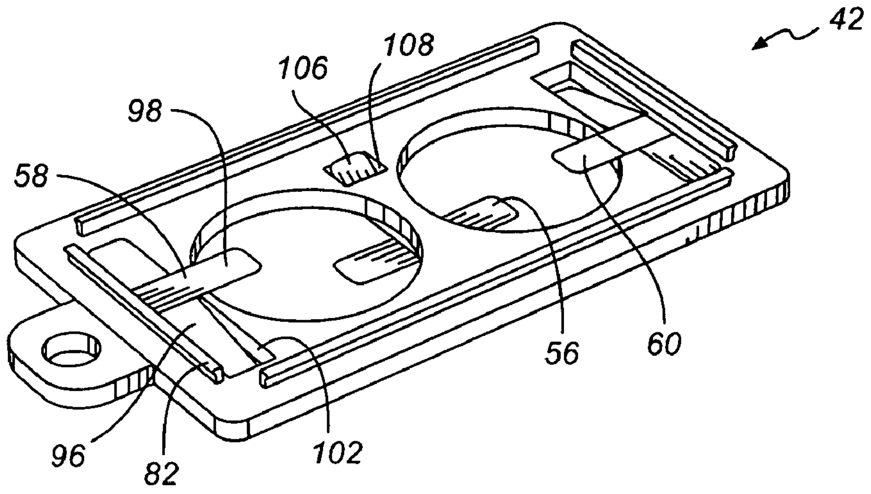
FIG. 6*a* is an isometric view of the top side of a battery holder.
Figure 6B:
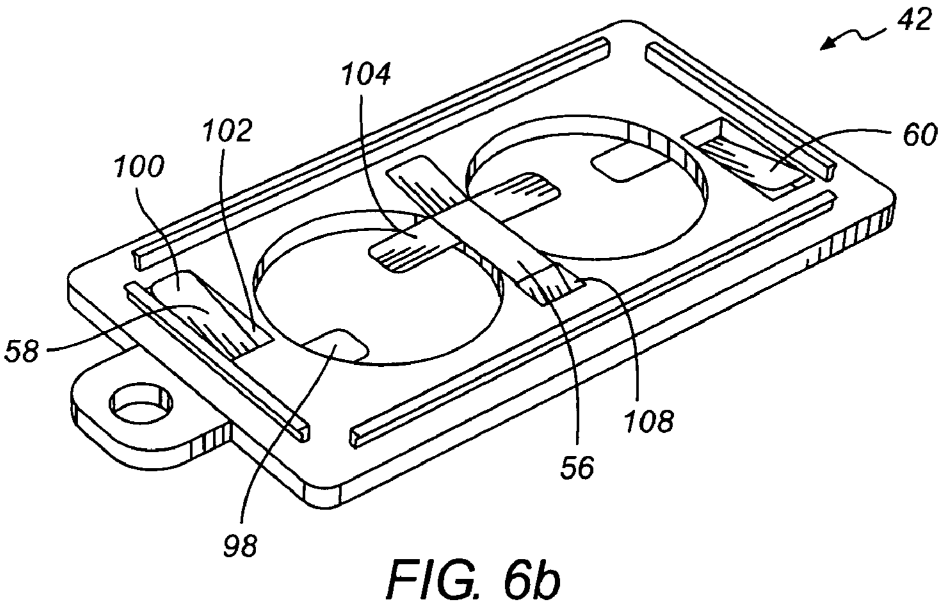
FIG. 6*b* is an isometric view of the bottom side of the battery holder of FIG. 6*a;*

FIGS. 6*a* and 6*b* illustrate the detailed features of the battery holder 42. The terminal 58 is constructed of a conductive material that has spring-like characteristics, such as stainless steel. The terminal 58 can be fastened to the plastic material of the battery holder 42 by various techniques. For example, the terminal 58 can be lodged in a groove, or can have a hole therein through which a plastic post protrudes. The end of the plastic post can be swaged to fasten the terminal 58 to the body of the battery holder 42. In the preferred embodiment, the terminal 58 is constructed as a leaf member 96 with a lateral arm 98 connected to the battery. One end 100 of the leaf member 96 extends through an opening 102 in the battery holder 42 so as to be accessible on the opposite side of the battery holder 42. The other terminal 60 is constructed and fixed to the battery holder 42 in a similar manner. A cross-shaped terminal 56 has a cross-piece 104 that extends laterally so as to be connectable to both batteries 44 and 46. The end 106 of the middle part of the terminal 56 extends through an opening 108 in the body of the battery holder 42 so as to be accessible on the other side of the battery holder 42. With this construction, the power from the battery can be coupled to both power transfer interfaces 62 and 70. The construction and placement of the terminals 56, 58 and 60 allow the battery holder 42 to be rotated 180° along a longitudinal axis and operate in the same manner.

As noted above, the dual key fob 30 is structured to accommodate different wireless printed circuit boards to thereby permit operation of different vehicles. For example, the wireless printed circuit board associated with a particular model of a Ford vehicle, can be removed from its original key fob and installed in the dual key fob 30. In addition, the wireless printed circuit board of a particular model of a Chevrolet can be removed from its original key fob and installed in the dual key fob 30. Both vehicles can thus be operated by the wireless printed circuit boards in the dual key fob 30. The advantage is that two separate key fobs do not have to be carried by the user of both vehicles. In order to facilitate this versatility, it is contemplated that various kits will be provided to allow the different wireless printed circuit boards to be incorporated into the dual key fob 30, it being realized that the various wireless printed circuit boards are of different shapes, have different battery requirements and have different power contact arrangements.

Figure 7A:
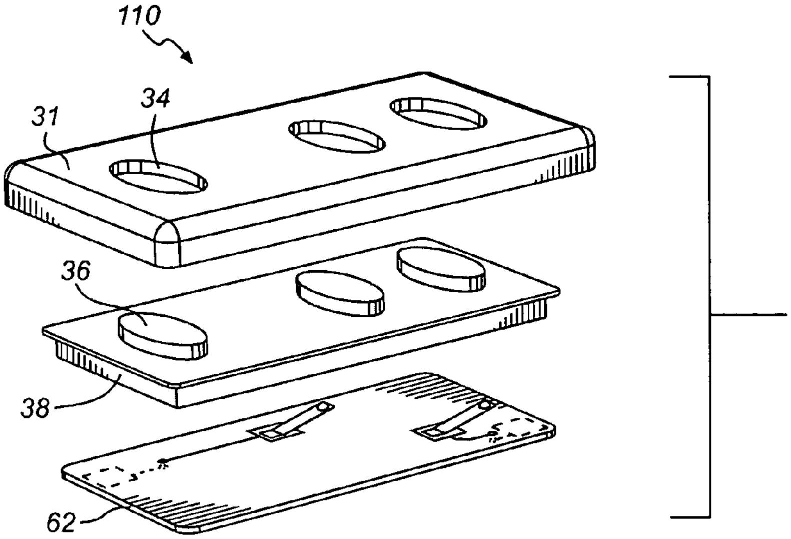
FIG. 7*a* illustrates the contents of a kit for one vehicle keyless entry fob.

FIG. 7*a* illustrates a kit 110 that can be used to incorporate a wireless printed circuit board into the dual key fob 30. Provided in the kit 110 is a top cover 31 that is constructed in substantially the same manner as described above, and with openings 34 specially located to match the location and pattern of the switch conductors on the wireless printed circuit board to be used. There would generally be a different top cover 31 for each different type of wireless printed circuit board. The kit 110 would also include an elastomeric key shorting member 38 with push buttons 36 having the same number and pattern as the openings 34 in the top cover 31. The bottom surface of the push buttons would have a conductive coating for short circuiting the switch contacts of the wireless printed circuit board to be used. Lastly, the kit 110 would include a power transfer interface 62 with a standard arrangement of bottom contact pads for contacting the terminals of the battery holder 42, and with top contact pads formed at locations for contacting the power contacts of the wireless printed circuit board to be used. Soldered to the top contact pads of the power transfer interface 62 may be spring contacts (as shown in FIG. 7*a*) for providing a reliable contact with the power contacts of the wireless printed circuit board. The wireless printed circuit board to be used is not included in the kit 110, as such circuit board is removed from the key fob that came with the vehicle. As described above, the wireless printed circuit board is placed between the elastomeric key shorting member 38 and the power transfer interface 62. The three components 31, 38 and 62 of the kit 110 are placed with the wireless printed circuit board and snap fit to the battery holder 42 of an existing dual key fob.

The kit 110 would be packaged and labeled as to the particular vehicle for use therewith. If a person had an existing dual key fob 30 with two wireless printed circuit boards for operating two different vehicles, and the person sold one vehicle and bought a different vehicle, such as a BMW, then the person could purchase the kit 110 labeled for use with the particular type of BMW. The person would remove the wireless printed circuit board from the key fob that came with the BMW. The components of the dual key fob associated with the vehicle that was sold would be removed. The wireless printed circuit board of the BMW would be placed with the components of the kit 110 and attached to the battery holder portion of the dual key fob 30. Vendors selling the kits would preferably assemble the kit components for consumers to modify existing dual key fobs, or to form new dual key fobs.

Figure 7B:
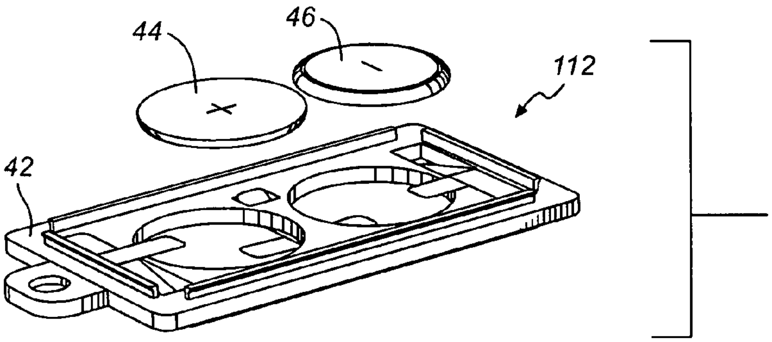
FIG. 7*b* illustrates the contents of a kit for use with other kits in holding two keyless entry fobs.
Figure 7C:
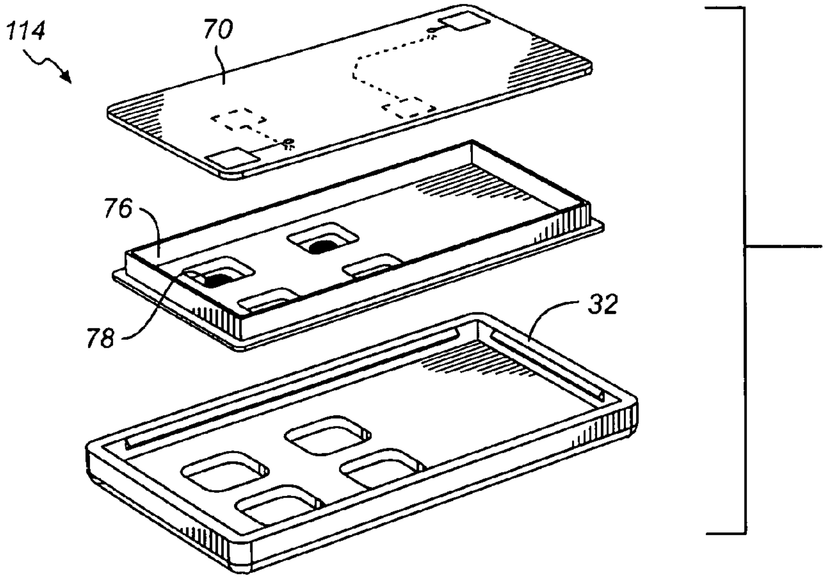
FIG. 7*c* illustrates the contents of a kit for a second car keyless entry fob.

In the event that the person does not have an existing dual key fob 30, then it is envisioned that one or more kits could be obtained to effectively build a dual key fob 30. As an example, the components of the kit 110 of FIG. 7*a* could be assembled with the component of a kit 112 of FIG. 7*b* and with the components of a kit 114 of FIG. 7*c*. In the example, the kit 112 may include only the battery holder 42, with or without the batteries 44 and 46. Again, only a single battery may be necessary in certain circumstances. The kit 114 may include similar components as that of the kit 110 of FIG. 7*a*, but for a different vehicle. For instance, the kit 114 of FIG. 7*c* may include components including an elastomeric key shorting member 76 specially adapted for the location and number of push buttons as used with the wireless printed circuit board associated with the vehicle to be controlled. A cover 32 is included that is specially adapted for use with the elastomeric key shorting member 76. Lastly, a power transfer interface 70 may be included in the kit to provide routing of battery power to the contact pads of the wireless printed circuit board to be used. As can be appreciated, the kits 110 and 114 are similar, but structured to operate with different wireless printed circuit boards.

In practice, there could be as many different kits 110 or 114 as there are different styles or shapes of wireless printed circuit boards. In many instances, the same style of a wireless printed circuit board could operate the apparatus of different vehicles. The visual appearance and size and shape of the wireless printed circuit board would be the same, but the components on the wireless printed circuit board would be different or tuned or programmed differently. In the event that the same style of printed circuit board is designed to function with different models of vehicles, then the same kit could be used with the different styles of wireless printed circuit boards. This would be made clear on the instructions of the packaging of the kit, which would indicate applicability of the kit to the various models of vehicles.

Figure 8:
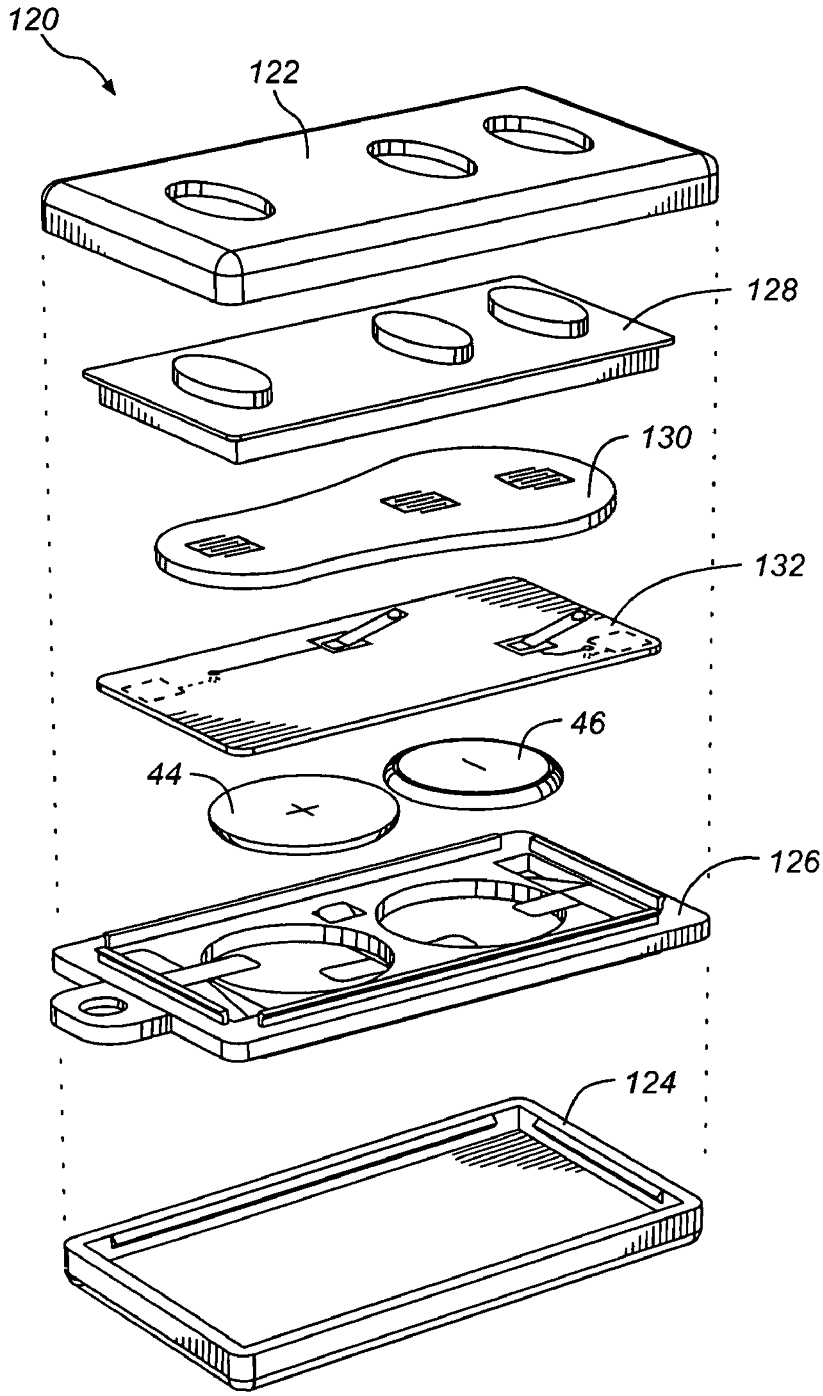
FIG. 8 is an exploded view of the components of an embodiment of the invention employing one vehicle keyless entry fob, and a blank cover on the other side of the fob.

FIG. 8 illustrates another embodiment of the invention. Here, a key fob 120 is adapted for use with a single wireless printed circuit board. The single-use key fob 120 includes a top cover 122 and a bottom cover 124. The bottom cover 124 snap fits directly to the battery holder 126. Nestled between the top cover 122 and the battery holder 126 are components including an elastomeric key shorting member 128, a wireless printed circuit board 130 and a power transfer interface 132. One or two batteries 44 and 46 can be fitted into the battery holder 126. While the key fob 120 functions very much like those currently sold with vehicles, such key fob 120 has the advantage that it allows for the expanded use of another wireless printed circuit board. In other words, in order to expand the versatility of the key fob 120 for use with another wireless printed circuit board, then a kit such as that of FIG. 7*a* or 7*b* could be purchased to allow the use of components for controlling the apparatus of another vehicle. The bottom cover 124 of the key fob 120 would be removed and discarded and the components of the appropriate kit, together with the wireless printed circuit board of the vehicle to be controlled, would be incorporated on the bottom side of the battery holder 126. The cover of the kit would be snap fit to the bottom side of the battery holder 126.

The components of the FIG. 8 embodiment can also be marketed in kit form, with or without the batteries. In addition, the blank cover 124 can be sold as an individual component in the event that the dual key fob 30 described above is required to be modified to remove one wireless printed circuit board. This could be necessitated if the associated vehicle were sold or traded, whereupon the associated wireless printed circuit board would be installed back into its original key fob and relinquished to the new owner of the vehicle. Rather than have a cover with openings and push buttons not used for anything, it would be beneficial to snap fit a blank cover 124 onto the battery holder. This would alleviate any attempts to operate the push buttons when one wireless printed circuit board is absent from the dual key fob 30.

Figure 9A:
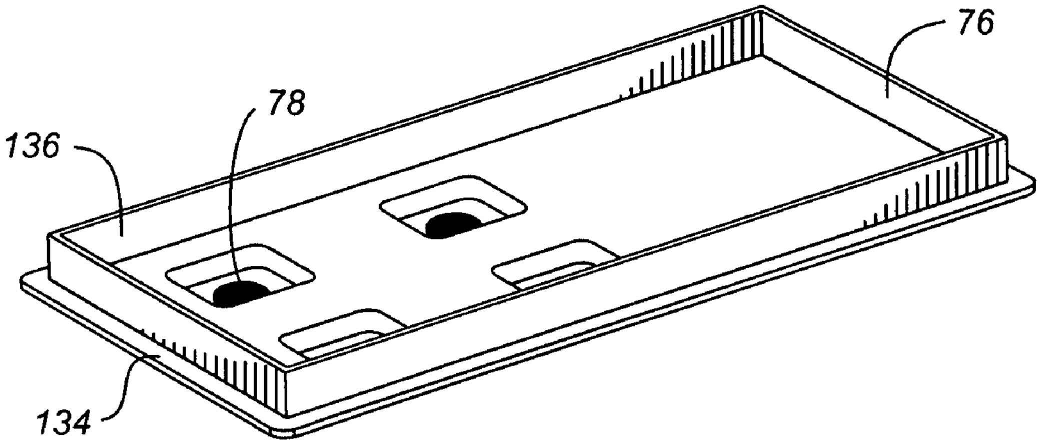
FIG. 9*a* is an isometric view of an elastomeric member used to short the contact switches of a wireless printed circuit board.

While the foregoing is illustrative of the use of an elastomeric key shorting member with the various embodiments of the key fob of the invention, other key shorting members can be used with the invention. FIG. 9*a* illustrates the elastomeric key shorting member 76 referred to above. The elastomeric member 76 includes a peripheral edge 134 that is squeezed between the battery holder and the cover. The elastomeric member 76 also includes a support flange 136 that allows registration of the elastomeric member 76 within the ridge 82 of the battery holder, as shown in FIG. 4*b*. The support flange 136 also serves to register and support the wireless printed circuit board therein so that the conductive area 78 is aligned with the switch conductors formed on the wireless printed circuit board.

Figure 9B:
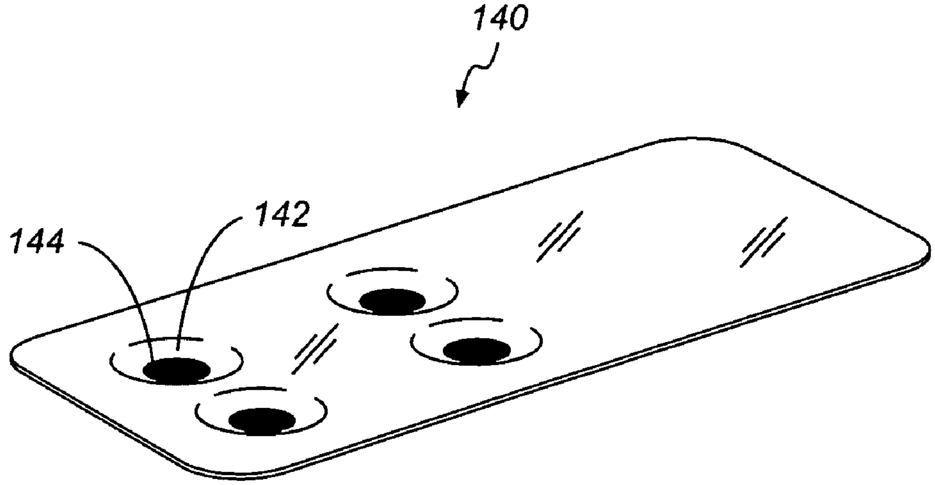
FIG. 9*b* is an isometric view of an alternative mylar piece used to short the contact switches of a wireless printed circuit board.

FIG. 9*b* illustrates an alternative to the elastomeric key shorting member 76. The key shorting member 140 of FIG. 9*b* is constructed of a Mylar material with dimples 142 or convex areas formed therein. Deposited in each dimple 142 is a conductive material 144. The dimple functions as a tactile element which, when depressed, causes movement of the conductive material toward and into contact with the switch conductors of a wireless printed circuit board. The key shorting member 140 has a peripheral shape suitable for nesting or registering within the ridge 82 of the battery holder 42.

Figure 10:
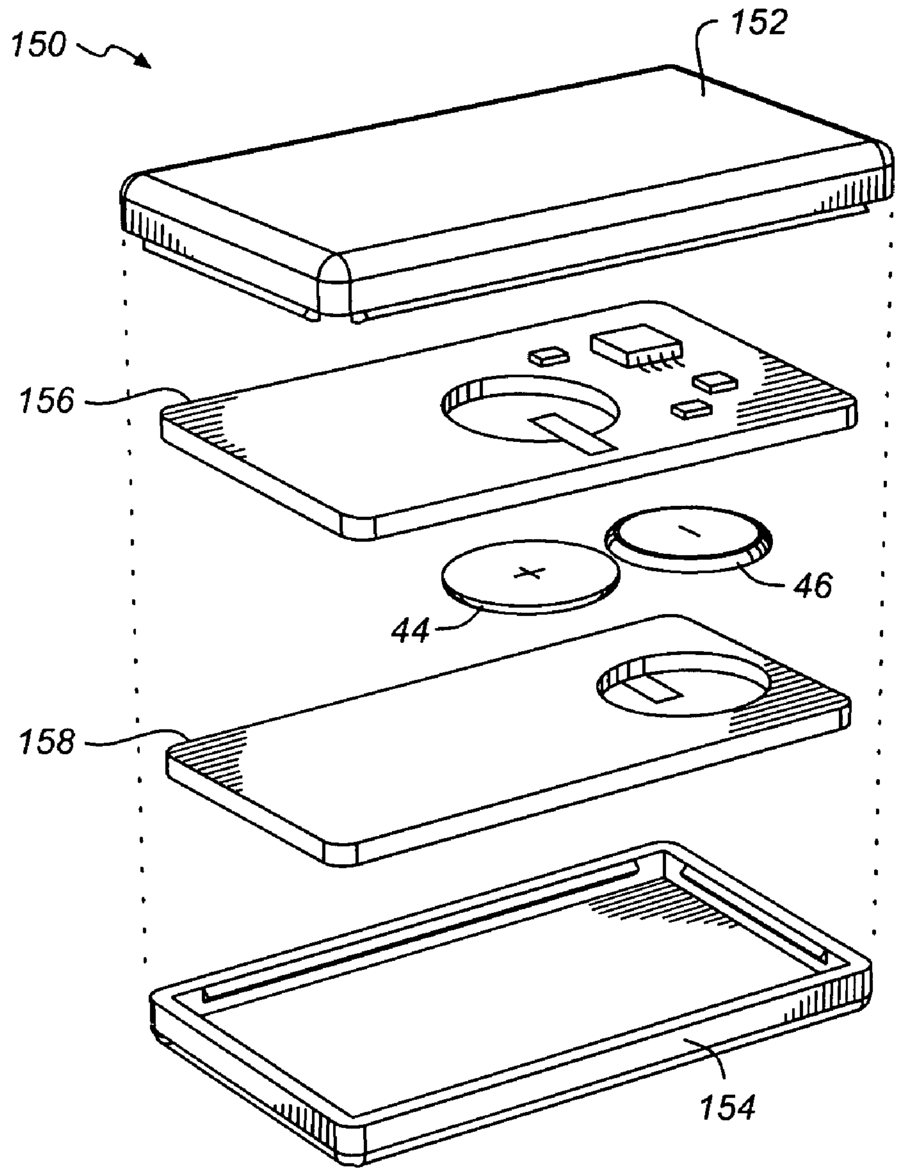
FIG. 10 is an exploded view of the components of a dual key fob of the invention, in which the printed circuit boards are actuated without push buttons.

FIG. 10 illustrates another embodiment of the invention. Here, a dual key fob 150 includes a top cover 152 and a bottom cover 154. The dual key fob 150 according to this embodiment is adapted for accommodating a pair of wireless printed circuit boards 156 and 158 of the type that are not activated by push buttons or other manual actuation devices. Rather, the wireless printed circuit boards 156 and 158 have circuits thereon that are responsive to electrical signals transmitted from the vehicle itself, and upon receipt of the signal and detection of a unique code associated with the vehicle, the wireless printed circuit board automatically transmits a "door unlock" signal or an "engine start" signal, or both. In other words, when the holder of the dual key fob 150 approaches the vehicle associated with the wireless printed circuit board in the dual key fob 150, an exchange of transmissions occurs therebetween, whereupon if the unique code that is transmitted by the vehicle and also stored in the wireless printed circuit board matches, the apparatus of the vehicle is automatically operated without any intervention by the holder of the dual key fob 150.

For the reason that the wireless printed circuit boards 156 and 158 do not require any push buttons, the top cover 152 and the bottom cover 154 are formed without any apertures or holes therein. In addition, the batteries 44 and 46 are also optional, depending on the type of wireless printed circuit boards being employed. Some wireless printed circuit boards of the type described utilize the energy transmitted from the vehicle to power the circuits of the wireless printed circuit board. This is similar in operation to the well-known toll tags used by automobiles in passing through gates of a toll road. In this case, no batteries are required. In other instances, the wireless printed circuit board may be designed to receive power from the signal transmitted from the vehicle for the circuits in carrying out a decoding function, but utilize a battery to transmit signals back to the vehicle. In any event, batteries 44 and 46 may or may not be required for use with the dual key fob 150.

As an alternative to the dual key fob 150, those skilled in the art may desire to provide a hybrid dual key fob of the type that employs a wireless printed circuit board that is push button operated, and another wireless printed circuit board that is solely responsive to transmissions from an associated vehicle. In addition to the components shown in the embodiment of FIG. 10, there could be included a battery holder for holding the batteries, and power transfer interfaces, as required. In other variations, wireless printed circuit boards may be provided which initially operate automatically to unlock a door or start the engine by being the proximity of the vehicle, as described above, but yet have one or more push buttons to operate other vehicle apparatus such as opening a trunk or rear utility door of an SUV. As yet other alternatives to the kits described above, the various components can be arranged to provide components for accommodating the wireless printed circuit boards of the type that do not require push button actuation.

Even though some wireless printed circuit boards may not require the use of switches or push buttons for actuation of the circuits thereof, one or more switches may yet be desirable. For example, a switch may be provided or otherwise accessible through one or both covers to enable operation of one wireless printed circuit board at a time, so that if the holder of the dual key fob 150 approaches both vehicles at the same time, both vehicles will not be simultaneously operated. Rather, the switch associated with one wireless printed circuit board could be used to disable one wireless printed circuit board and thus allow the other wireless printed circuit board to be operated. The switch could be connected to remove battery power from the wireless printed circuit board to be disabled, or be wired to short circuit one or more connections on the printed circuit board to thereby disable the circuits thereon. It is contemplated that the switch would be an on/off slide switch which provides continuous enabling or disabling of a respective wireless printed circuit board until switched to the other position.

Figure 11:
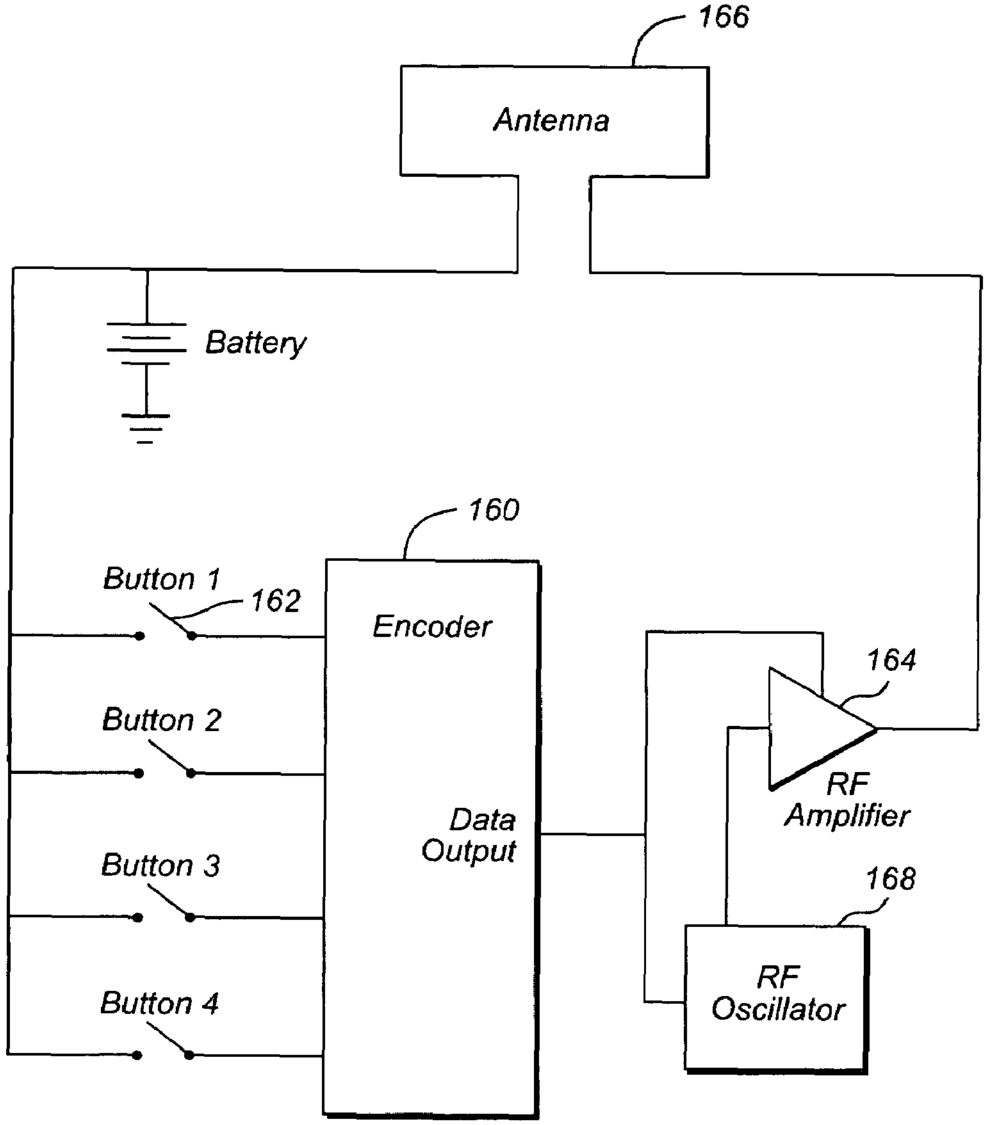
FIG. 11 (Prior Art)
FIG. 11 is a block diagram of a conventional wireless transmitter circuit of a keyless entry fob.

FIG. 11 illustrates in block diagram form the basic functions of a wireless printed circuit board of conventional design. An encoder 160 provides output data in response to the actuation of one of the four push buttons, one identified by reference numeral 162. One push button may cause the encoder 160 to produce a code for locking a vehicle door, and another push button may cause the unlocking of the door. Another push button may unlock the trunk of the vehicle and yet another push button may be operative to actuate the vehicle alarm based on a panic situation. The output code produced by the encoder 160 is coupled to an RF amplifier 164 which drives an antenna 166. Typical RF frequencies transmitted by wireless key entry systems are in the neighborhood of 315 MHz. An RF oscillator 168 generates the relevant frequency that is encoded and drives the antenna 166. A battery, such as battery 44 and or 46 can be employed to power the circuits of the wireless printed circuit board.

While the foregoing describes the various embodiments of the invention, those skilled in the art may find it expedient to modify or otherwise change the functional or structural details of the invention, without departing from the invention. For example, while the various kits described above may include a cover, the cover from the original key fob may be employed, together with the elastomeric key shorting member and the wireless printed circuit board, for incorporation with the battery holder and other components of the invention. Here, one side of the battery holder could be constructed in a shape for snap fitting to the original key fob cover. In addition, those skilled in the art may find that one or both of the power transfer interfaces can be integrated with the battery holder to form a unit. In this case, the battery holder would be replaced each time a different wireless printed circuit board of a different style was used. Alternatively, the battery holding function can be incorporated into one or both of the power transfer interfaces to reduce the number of components forming the invention. One power transfer interface may be constructed to hold one battery, and the other power transfer interface may be constructed to hold the other battery, or one battery could be employed to power both wireless printed circuit boards. Various other features can be incorporated into the dual key fob of the invention, including an LED for illuminating an object, as well as a physical key(s) holder for manual entry into a vehicle. As can be seen, many different combinations and permutations of the components are available to maximize the benefit desired. Indeed, the principles and concepts of the invention are not limited to the use of only two wireless printed circuit boards, as three or more could be incorporated into a single multi-key fob.

The foregoing describes the various embodiments of the dual key fob as employing wireless printed circuit boards from original single board key fobs. This is not a necessity, as custom wireless printed circuit boards could be provided as identical or substantially identical replacements for those found in the original key fobs. In the event that custom wireless printed circuit boards are provided, it may be advantageous to design the printed circuit boards with a standard power contact arrangement, thereby alleviating the need for a power transfer interface. In other words, even though the custom wireless printed circuit boards would function as a substitute for the various styles and types of original wireless printed circuit boards, the power contact arrangements of all of the custom wireless printed circuit boards would be the same and thus would all match the power terminal arrangement of the battery holder, if such a holder were required.

In the utilization of custom wireless printed circuit boards, the boards may be provided with edge contacts for sliding into a slot formed in the cover of the dual key fob. A connector with multiple contacts could be located at the terminal end of the slot to receive the corresponding edge contacts of the custom wireless printed circuit board. With this arrangement, the replacement of one custom wireless printed circuit board for another in the dual key fob would be greatly facilitated. Battery connections could be made via the connector contacts rather than directly to the surface contacts of the wireless printed circuit board. Both covers of a dual key fob could be fabricated to provide respective slots for accommodating custom wireless printed circuit boards with edge contacts.

While the present invention has been described above in connection with various embodiments, it is to be understood that the disclosure has been made by way of example only, as many changes in detail and structure may be made to the invention without departing from the spirit and scope of the invention, as defined by the appended claims.

What is claimed is:

1. A dual key fob, comprising:

a first wireless circuit module adapted for transmitting information to a first vehicle;

a second wireless circuit module, different from said first wireless circuit module and sharing no signal processing circuits with said first wireless circuit module, said second wireless circuit module adapted for transmitting information to a second vehicle; and a single enclosure for housing said first and second wireless circuit modules.

2. The dual key fob of claim 1, wherein said first wireless circuit module and said second wireless circuit module can operate simultaneously to control the first and second vehicles concurrently.

3. The dual key fob of claim 1, wherein at least one said wireless circuit module is adapted to operate apparatus of an associated vehicle by being in the proximity thereof without push button actuation.

4. The dual key fob of claim 1, wherein each said wireless circuit module is manufactured by respective makers of the vehicles.

5. The dual key fob of claim 1, further including a battery holder for holding one or more batteries, said battery holder located between said first and second wireless circuit modules.

6. The dual key fob of claim 1, further including a power transfer interface for aligning power contacts of said first wireless circuit module to at least one battery.

7. A method of assembling a dual key fob; comprising the steps of:

removing an electronic module from a first key fob associated with a first vehicle, said first electronic module having switch contacts;

removing an electronic module from a second key fob associated with a second vehicle, said second electronic module having switch contacts;

using a battery to power the first and second electronic modules;

placing a first push button member equipped with a finger-operated button, adjacent the first electronic module so that the finger-operated button of the first push button member is able to activate the switch contacts of the first electronic module;

placing a second push button member equipped with a finger-operated button adjacent the second electronic module so that the finger-operated button of the second push button member is able to activate the switch contacts of the second electronic module; and enclosing said first and second electronic modules, the battery and the first and second push button members within a common enclosure, said enclosure having apertures so that the finger-operated buttons are accessible therein.

8. The method of claim 7, further including at least one power transfer interface in contact with the battery for providing respective power contacts at desired locations associated with power contacts of one said first and second electronic module.

9. The method of claim 8, further including enclosing the battery within the power transfer interface.

10. The method of claim 7, further including using respective elastomeric members as said first and second push button members, where said first and second elastomeric members have different colored finger-operated buttons to facilitate association of the electronic modules with different vehicles.

11. A kit for making a dual key fob from an existing single key fob controlling a first vehicle by using an electronic module of an old key fob that controls a second vehicle, said kit comprising:

a new cover adapted for attachment to a cover of the existing single key fob to form an enclosure for the dual key fob to house the electronic module of the old key fob, said new cover having one or more apertures therein;

a new push button member, said new push button member having at least one finger-operated button accessible by a respective aperture formed in the new cover; and a new power transfer interface adapted for coupling power from a battery of the existing single key fob to the electronic module that controls the second vehicle, said power transfer interface having first and second contacts connected together, said first contact located on one side of the power transfer interface and adapted for connection to the battery, said second contact located on an opposite side of the power transfer interface in a location adapted for contacting a power contact of the electronic module that controls the second vehicle.

12. The kit of claim 9, wherein said power transfer interface further includes third and fourth contacts connected together, said third contact located on one side of the power transfer interface in electrical contact with the battery, said fourth contact located on an opposite side of the power transfer interface in a location for contacting a power contact of the electronic module.

13. The kit of claim 11, wherein said push button member comprises an elastomeric key shorting member with plural said finger-operated buttons formed integral therewith, said elastomeric key shorting member supporting said electronic module registered thereto.

14. The kit of claim 13, wherein said elastomeric key shorting member includes a flange on an underside thereof for supporting a wireless printed circuit board of a first shape, and said elastomeric key shorting member has an outer peripheral shape different from said first shape.

15. The kit of claim 11, wherein said kit defines a first kit, and further including a second kit, said second kit including a battery holder for holding one or more batteries, said battery holder adapted for snap fitting to said first cover.

16. The kit of claim 11, further including a battery as part of said kit.

* * * * *